United States Patent [19]
Howell

[11] 3,963,959
[45] June 15, 1976

[54] GROUND FAULT CIRCUIT INTERRUPTING DEVICE AND DIFFERENTIAL CURRENT SENSOR THEREFOR

[75] Inventor: Edward Keith Howell, Simsbury, Conn.

[73] Assignee: General Electric Company, New York, N.Y.

[22] Filed: Apr. 28, 1975

[21] Appl. No.: 571,930

Related U.S. Application Data

[63] Continuation-in-part of Ser. No. 509,462, Sept. 9, 1974.

[52] U.S. Cl. .................. 317/9 R; 317/18 R; 317/18 D; 317/27 R; 317/33 R
[51] Int. Cl.² .................................. H02H 3/28
[58] Field of Search .......... 317/9 R, 9 A, 14 D, 317/18 R, 26, 27 R, 33 R

[56] References Cited
UNITED STATES PATENTS

| | | |
|---|---|---|
| 3,213,321 | 10/1965 | Dalziel .................. 317/18 D |
| 3,353,065 | 11/1967 | Bassani .................. 317/27 R |
| 3,522,478 | 8/1970 | Reis .................. 317/18 R |
| 3,535,590 | 10/1970 | Mayer .................. 317/18 D |
| 3,713,003 | 1/1973 | Benham .................. 317/18 D |

Primary Examiner—J D Miller
Assistant Examiner—Harry E. Moose, Jr.
Attorney, Agent, or Firm—Robert A. Cahill; Walter C. Bernkopf; Frank L. Neuhauser

[57] ABSTRACT

The secondary winding of a differential current transformer in a ground fault circuit interrupter is short circuited through an electronic switch. The switch is periodically opened to force any secondary current occasioned by the existence of a ground fault to flow through a burden resistor, thereby developing a relatively high amplitude signal voltage thereacross for processing by a signal processor pursuant to initiating circuit interruption.

11 Claims, 3 Drawing Figures

GROUND FAULT CIRCUIT INTERRUPTING DEVICE AND DIFFERENTIAL CURRENT SENSOR THEREFOR

REFERENCE TO RELATED APPLICATION

This application is a continuation-in-part of applicant's copending application Ser. No. 509,462, filed Sept. 9, 1974.

BACKGROUND OF THE INVENTION

Ground fault circuit interruption (GFCI) devices have been sanctioned by the National Electric Code for use in residential circuits to protect against the hazards of electric shock. Such GFCI devices, as presently commercially available, utilize a differential current transformer to sense a current imbalance in the line and neutral conductors occasioned by line fault current returning to the source through an unintended ground circuit path other than the neutral conductor. To prevent injurious electrical shock, the differential current transformer must develop a signal voltage of sufficient magnitude to enable a signal processor to initiate circuit interruption when the current differential in the line and neutral conductors is five milliamps or more. For ease of manufacture and to provide a compact design, the line and neutral conductors, which constitute primary windings of the differential current transformer, each make a single pass through the aperture of the toroidal transformer core. Thus, to satisfy a 5 milliamp trip level, the signal processor must be designed to respond to a transformer primary excitation of 0.005 ampere-turns. So that the design constraints on the signal processor are not so rigid as to be prohibitively expensive, the differential transformers must have a high permeability core and a secondary winding of many turns — typically in excess of 1000 turns of very fine wire — in order to develop signal voltages of practical magnitudes. Signal levels are nevertheless quite low, 1 to 10 millivolts, requiring high amplification. With such high amplification, the processor design must insure amplifier stability and adequate noise immunity to prevent nuisance tripping of the GFCI device.

It is accordingly an object of the present invention to provide a sensor for developing a large signal voltage in response to a small current imbalance in a pair of conductors.

Another object of the invention is to provide an improved ground fault circuit interruption (GFCI) device incorporating a differential current sensor of the above character.

Yet another object is to provide a GFCI device of the above character which is less expensive to manufacture and more reliable in operation.

Other objects of the invention will be made apparent from the following detailed description and claims.

SUMMARY OF THE INVENTION

In accordance with the present invention there is provided an improved sensor for responding to low level differentials in the current flowing in at least two conductors. The improved sensor has particular application in ground fault circuit interrupting (GFCI) devices for residential power distribution circuits wherein the prescribed trip level is a current differential of 5 milliamps or more. The sensor response, powered by the current differential, is in the form of a voltage signal of considerably larger amplitude than has been the case heretofore.

More specifically, the sensor of the present invention is in the form of a differential current transformer. Differential current transformers are presently being utilized in GFCI devices as the current differential sensor. However, it is a signal feature of the present invention to provide a sensor utilizing a differential current transformer of significantly cost improved design for implementation in GFCI devices. Moreover, the sensor of the invention is uniquely equipped to generate, in response to a current differential, a proportional voltage signal of larger amplitude — by at least an order of magnitude — than has heretofore been the case in GFCI devices. This permits simplification and cost improvement of the signal processor design, not only from the standpoint of signal handling, but also insofar as noise immunity is concerned. Thus, a more reliable GFCI device considerably less susceptible to nuisance tripping is created.

The sensor of the invention responds to current differentials in a pair of single-turn primary windings which, in a GFCI application, are respectively connected in the line and neutral sides of the distribution circuit for which ground fault protection is sought. The transformer core can be and preferably is an inexpensive, low permeability ferrite core, rather than the expensive, high permeability nickel-iron core currently utilized in GFCI differential current transformers. Moreover, the instant sensor requires a secondary winding of considerably fewer turns — as much as an order of magnitude/fewer turns — than existing GFCI differential current transformers. This factor also contributes to a lower cost and greater reliability, since wire breakage is less a problem.

The secondary winding of the differential current transformer is, in accordance with the present invention, shorted on itself through an electronic switch connected in shunt with a burden resistor. Thus, secondary current occasioned by the existence of a current differential in the primary windings normally flows through the switch, thereby permitting usage of a burden resistor of higher resistance than can be used in the situation where secondary current always flows through a burden resistor, as is conventional practice. Periodically the electronic switch is opened to then force the secondary current through the burden resistor, thereby developing, by virtue of its greater resistance, a momentary, relatively large signal voltage thereacross for application to the signal processor pursuant to initiating a trip function. Since the existence of secondary current is sensed periodically and, even then, only for a brief instant, and since electrical noise is random and typically intermittent, the present invention affords, as a collateral benefit, far greater immunity to nuisance tripping.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in conjunction with the accompanying drawings, in which.

Like reference numerals refer to corresponding parts throughout the several views of the drawing.

DETAILED DESCRIPTION

Figure 1:
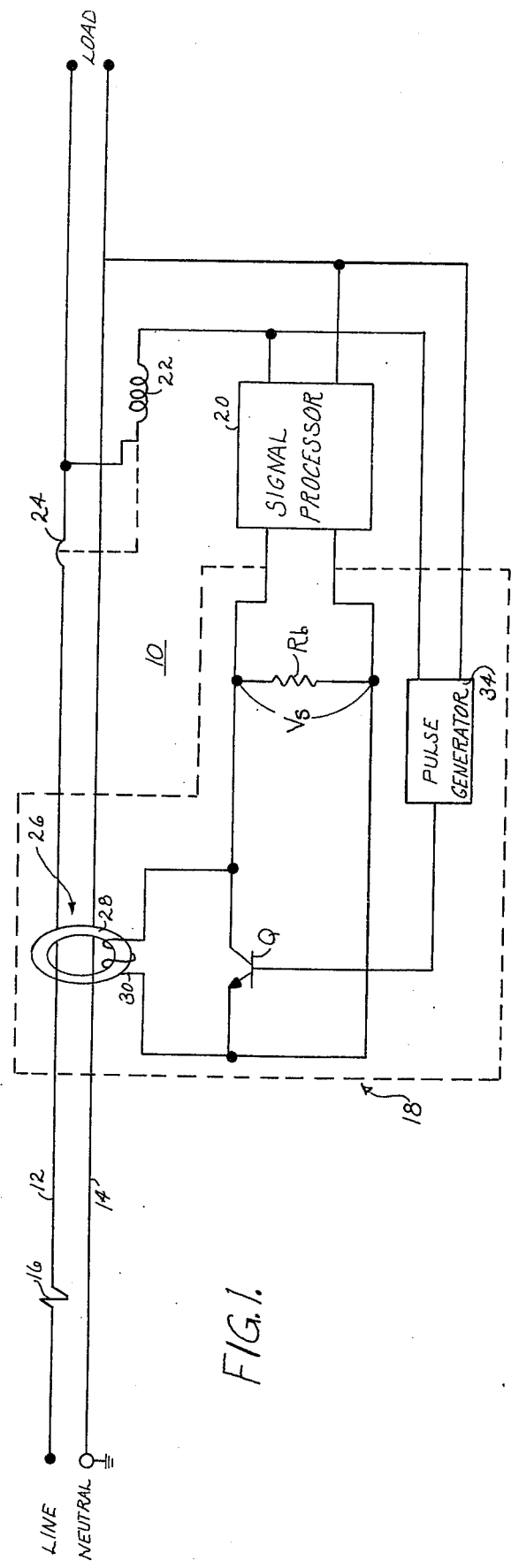
FIG. 1 is a schematic diagram, partially in block form, of a ground fault circuit interruption (GFCI) device embodying the present invention.

Referring to the drawing, a ground fault circuit interrupting (GFCI) device, generally indicated at 10 in FIG. 1, is shown being implemented to interrupt a power distribution circuit consisting of a line conductor 12 and a neutral conductor 14 in the event of high impedance ground fault on the line conductor. The neutral conductor is illustrated as being grounded at the source, as is conventional practice in residential circuits. The GFCI device includes overload and short circuit responsive elements, indicated diagrammatically at 16, as is also conventional. A differential current sensor constructed according to the invention and generally indicated at 18, senses a current imbalance in the line and neutral conductors occasioned by ground leakage current returning to the source from the line conductor by a path other than the neutral conductor. The sensor signal response is processed by a signal processor 20 which operates to trigger an electronic switch, typically a silicon controlled rectifier (not shown), thereby completing an energization circuit for a trip solenoid 22 across the line and neutral conductors. Actuation of the trip solenoid initiates separation of contacts 24 to open the line side of the distribution circuit, interrupting current flow.

Sensor 18, as seen in FIG. 1, includes a differential current transformer, generally indicated at 26, comprising a toroidal core 28 through which the line and neutral conductors pass as separate, single-turn primary windings. A multi-turn secondary winding 30 is wound on core 28, e.g., 75 to 300 turns. As long as the currents in the line and neutral conductors are equal, the net flux in core 28 is zero and no current or voltage is induced in secondary winding 30. On the other hand, if the line conductor on the load side of transformer 26 experiences a ground fault through which fault current flows to ground and back to the source by a ground circuit path rather than the neutral conductor, a current imbalance is established in the primary windings of the differential transformer. The resulting magnetic flux induces a voltage in secondary winding 30. This induced voltage causes a current to flow through a burden resistor Rb, thereby developing a signal voltage Vs for processing by signal processor 20. Should the signal voltage exceed a predetermined level corresponding to a ground fault current of 5 milliamps, the signal processor must proceed to effect energization of the trip solenoid leading to interruption of the distribution circuit by contacts 24.

It will be appreciated that a 5 milliamp trip level means that the signal processor must act on a signal voltage Vs developed in response to a transformer primary excitation of no more than 0.005 ampere-turns, and preferably on the order of 0.001 ampere-turns. Thus, existing GFCI designs call for a differential transformer having a high permeability core with a very large number of secondary turns in order to produce a signal voltage of manageable proportions. In accordance with the instant invention, the two sides of the secondary winding 30 are shorted together through an electronic switch which is illustrated as being a simple transistor switch Q, but may take other forms. Thus, as seen in FIG. 1, the two sides of secondary winding 30 are shorted together through the collector-emitter circuit of transistor Q while the switch is in its highly conductive state. A pulse generator 34, powered from the distribution circuit and synchronized to the line frequency, maintains the electronic switch Q in its conductive state except for periodic, brief moments when it issues a negative-going pulse to the base of the transistor switch. The electronic switch abruptly turns OFF or becomes non-conductive, and the secondary current is diverted through the burden resistor Rb to develop a voltage signal Vs in the form of a relatively high amplitude voltage spike across the burden resistor. The peak amplitude of this voltage spike is essentially proportional to the product of the burden resistance times the secondary current normally conducted through the electronic switch; this secondary current being proportional to the current imbalance in the line and neutral conductors. The signal processor 20 processes this voltage signal spike Vs, and if its peak amplitude exceeds a predetermined minimum corresponding to a prescribed ground leakage current trip level, e.g., 5 milliamps, a ground fault trip function is initiated.

Figure 2:
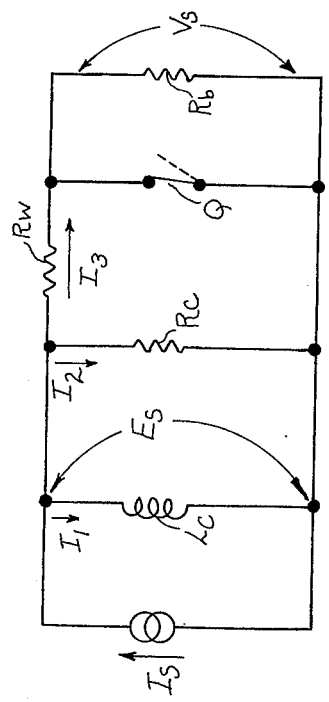
FIG. 2 is an equivalent circuit diagram of the differential current transformer of FIG. 1.

For a better understanding of operation of the present invention, reference is now made to FIG. 2 which illustrates an equivalent circuit of the differential transformer secondary. The primary differential current transforms to a secondary current Is of a magnitude determined by the primary current imbalance multiplied by the turns ratio, i.e., 1/Ns, where Ns equals the secondary turns. This secondary current is divided among three parallel equivalent circuit paths. Thus, the secondary current in effect splits into a current I1 flowing through an inductor Lc representing the magnetizing inductance of the transformer secondary, a current I2 flowing through a resistor Rc representing the losses in core 28, and a current I3 flowing through a resistor Rw (wire losses) and either electronic switch Q when closed or burden resistor Rb when the switch is open. It will be seen that to maximize the amplitude of voltage signal Vs developed across burden resistor Rb, the product of the current I3 times the resistance R6 should be made as large as practicable. This is achieved in accordance with the present invention by normally operating the transformer secondary in a short-circuited mode, i.e., with the electronic switch closed. This permits selecting a relatively large resistance value for burden resistor Rb without jeopardizing this favorable current division. Heretofore, with secondary current I3 always flowing through the burden resistor, it was necessary to choose a low value of burden resistance in order to achieve a favorable current division, for improved signal voltage amplitude and particularly decreased sensitivity to variations in the core parameters. It is seen that for a given magnitude of current I3, the capability of significantly increasing the burden resistance achieves a dramatic increase in the signal voltage developable thereacross. Moreover, since the effective burden resistance becomes negligible with the switch closed, the magnitude of current I3 is increased somewhat, causing an additional increase in the signal voltage. By virtue of the very low impedance in this essentially short circuited path, the currents I1 and I2 become very small and most of the secondary current Is flows as current I3 through the electronic switch.

It will also be noted that favorable current division is further enhanced by reducing wire losses (Rw) through the implementation of fewer secondary winding turns of larger gauge wire than is utilized in present GFCI differential current transformer designs. This also affords significant manufacturing and cost benefits, as wire breakage becomes less of a problem.

In addition, the present invention readily accommodates the utilization of an inexpensive, low permeability transformer core material, such as ferrite, as contrasted to the expensive, high permeability core material being used. A ferrite core has an additional benefit in that its equivalent core loss resistance Rc is quite large. Thus the current I2 in the equivalent circuit is essentially zero in the short circuited mode and can be neglected for purposes of this description. While the inductance Lc of a ferrite core transformer is less, the current I1 is nevertheless small in the short-circuited mode and a predominant portion of the secondary current Is flows as current I3 through the electronic switch Q.

In accordance with the present invention, electronic switch Q is momentarily opened by pulse generator 34 to divert the flow of current I3 through burden resistor Rb. This strobing of electronic switch Q into non-conduction is, in the illustrated embodiment, effected at least once during each cycle of the secondary current and ideally when the sinusoidal secondary current is going through its amplitude peak. The time interval of switch non-conduction is preferably quite short, for example, 0.5 to 50 microseconds. In comparison to the 16,667 microsecond period of a 60 Hertz wave, this interval of switch non-conduction is quite short indeed. This is advantageous from the standpoint of noise immunity. Since electrical noise on the distribution circuit is random and typically intermittent, the probability of its being present in the transformer secondary circuit during the brief moment when the electronic switch is non-conductive is quite low. At all other times, any noise in the secondary circuit is shunted from the signal processor through switch Q.

It will be appreciated however that it is the initial diversion of the secondary current component I3 from flow through switch Q to flow through the larger burden resistor Rb that is responsible for the high amplitude of the voltage signal Vs. The duty cycle of the switch operation and its phase relationship to the secondary current sine wave are variables to be adjusted depending on the transformer characteristics and other circuit parameters to achieve optimum performance.

Figure 3:
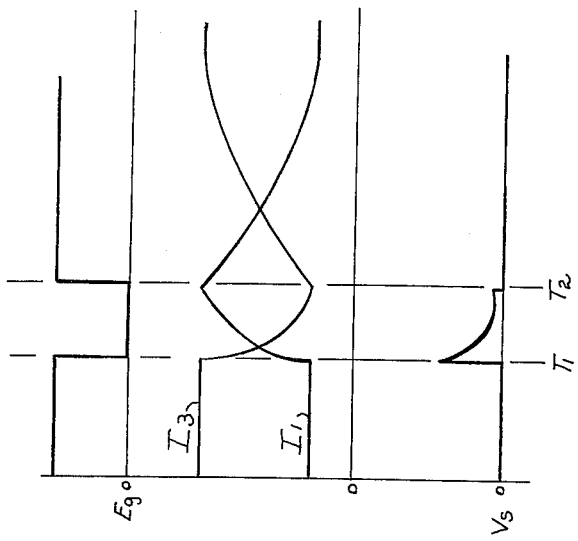
FIG. 3 is a timing diagram illustrating various electrical waveforms present in the circuit of FIG. 1.

Referring to FIG. 3, it is seen that when the pulse generator output Eg goes from a plus voltage level to zero at time t1, the electronic switch abruptly goes into non-conduction and the current I3 is diverted through burden resistor Rb. The sudden addition of the impedance of the burden resistor into the secondary circuit causes a readjustment of the secondary current split, such that the current I1 rises as the current I3 through the burden resistor falls. Nevertheless, a high amplitude voltage signal spike Vs incident with the opening of switch Q, as illustrated in FIG. 3, is developed across the burden resistor for application to the signal processor 34. At time t2, the pulse generator output Eg returns to its normal positive voltage level, thereby driving the transistor switch back into conduction. The currents I3 and I1 then return to their respective high and low relative levels.

A prototype version of the instant invention was found to develop a voltage signal spike of a 200 millivolt peak amplitude across a burden resistance of 3600 ohms in response to a 5 milliamp current differential. The transformer comprised a ferrite core with a 125-turn secondary winding. This is contrasted with currently typical GFCI specifications where a 5 milliamp current differential produces a useful signal amplitude on the order of 1 to 10 millivolts. The typical GFCI differential current transformer comprises an expensive, high permeability, nickel-iron core with as many as 1500 secondary turns.

It will be appreciated that numerous refinements in the disclosed embodiment of the invention will occur to those skilled in the art. Thus, for example, the voltage signal Vs may be subjected to pulse shaping by the addition of a capacitor for more convenient handling by the signal processor. Moreover, voltage signal pulses may be subjected to integration over plural cycles of the secondary current. To further enhance noise immunity, the pulse generator output can be supplied as a normally inhibiting signal to the signal processor so as to disable or abort any processor response to noise entering over paths other than its signal input circuit. In addition, the GFCI device of the present invention may also include provisions for initiating a ground fault trip function in the event of a low impedance ground fault on the neutral conductor.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A sensor for utilization in a ground fault circuit interrupting device wired into a power distribution circuit comprising at least one line conductor and a neutral conductor, said sensor comprising, in combination:
   A. a differential current transformer including
      1. a core in which is developed a magnetic flux occasioned by a current imbalance in the line and neutral conductors of the distribution circuit, and
      2. a secondary winding wound on said core;
   B. an output element connected across said secondary winding for developing a signal voltage indicative of the magnitude of secondary current developed as the result of the current imbalance;
   C. a switch connected across said secondary winding in shunt with said output element; and
   D. means controlling said switch to convert from a closed condition, short circuiting said secondary winding and shunting secondary current from said output element, to an open condition, diverting said secondary current through said element pursuant to developing said signal voltage.

2. The sensor defined in claim 1, wherein said switch is in the form of an electronic switch.

3. The sensor defined in claim 2, wherein said switch controlling means includes a pulse generator supplying a periodic pulse output to said electronic switch for rendering said switch non-conductive during the interval of each said pulse.

4. The sensor defined in claim 1, wherein said core is a ferrite core.

5. The sensor defined in claim 4, wherein said secondary winding has on the order of 75 to 300 turns.

6. The sensor defined in claim 1, wherein said output element includes a burden resistor.

7. A ground fault circuit interrupting device for interrupting an electrical power distribution circuit including at least one line conductor and a neutral conductor in the event of a ground fault on the line conductor, said device comprising, in combination:
   A. circuit interrupting contacts for connection in series with the line conductor;
   B. a trip solenoid operating, when energized, to initiate separation of said contacts and interruption of current flow in the distribution circuit;
   C. a differential current transformer including:
      1. a first primary winding for connection in series with the line conductor,
      2. a second primary winding for connection in series with the neutral conductor, and
      3. a secondary winding in which is developed a secondary current proportional to an imbalance in the currents flowing through said first and second primary windings;
   D. an output element connected across said secondary winding;
   E. means connected across said secondary winding for shunting secondary current from said output element, said means operating periodically to divert secondary current through said output element to develop a signal voltage thereacross of a peak amplitude proportional to the secondary current magnitude; and
   F. a signal processor for processing said signal voltage and initiating energization of said trip solenoid in the event the amplitude of said signal voltage exceeds a predetermined minimum.

8. The ground fault circuit interrupting device of claim 7, wherein said means includes:
   1. an electronic switch connected across said secondary winding in shunt with said output element, and
   2. a pulse generator developing a pulse output for controlling said switch to short circuit said secondary winding and shunt secondary current from said output element and periodically to divert secondary current through said output element pursuant to developing said signal voltage.

9. The ground fault circuit interrupting device defined in claim 8, wherein said first and second primary windings each consist of a single turn, and said transformer further includes a toroidal core of ferrite material.

10. The device defined in claim 9, wherein said secondary winding has on the order of 75 to 300 turns.

11. The device defined in claim 7, wherein the line frequency of the power distribution circuit is 60 Hertz, and said pulse generator output controls said switch to divert secondary current through said output element at least once during each cycle of the secondary current for an interval of from 0.5 to 50 microseconds.

* * * * *